(12) United States Patent
Yokoyama

(10) Patent No.: US 7,605,983 B2
(45) Date of Patent: Oct. 20, 2009

(54) VIEWING OPTICAL SYSTEM, AND IMAGING APPARATUS COMPRISING THE SAME

(75) Inventor: Keitaro Yokoyama, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/283,850

(22) Filed: Sep. 15, 2008

(65) Prior Publication Data
US 2009/0097128 A1   Apr. 16, 2009

(30) Foreign Application Priority Data
Oct. 10, 2007   (JP)   ............................. 2007-263971

(51) Int. Cl.
*G02B 25/00* (2006.01)
(52) U.S. Cl. .................. 359/645; 359/643; 359/644; 396/382; 396/384
(58) Field of Classification Search ......... 359/643–645, 359/726, 784; 396/382, 384
See application file for complete search history.

(56) References Cited

U.S. PATENT DOCUMENTS 6,125,238 A * 9/2000 Hasushita et al. ........... 396/296

FOREIGN PATENT DOCUMENTS

| JP | 59-148021 | 8/1984 |
| JP | 61-156017 | 7/1986 |
| JP | 2005-055874 | 3/2005 |
| JP | 2005-289039 | 10/2005 |

* cited by examiner

*Primary Examiner*—Joseph Martinez
(74) *Attorney, Agent, or Firm*—Kenyon & Kenyon LLP

(57) ABSTRACT

The invention relates to a viewing optical system for viewing an object image formed on a focusing screen, and an imaging apparatus comprising the same. An image erection optical system comprises a prism having an internal reflective surface. An eyepiece optical system comprises, in order from a screen side to an exit pupil side, a first lens component having negative refracting power wherein its exit pupil-side surface has a paraxial-radius-of-curvature absolute value smaller than that of its screen-side surface, a second lens component in a double-convex shape and a third meniscus lens component in a meniscus shape concave on an exit pupil side. The total number of lens components included in the eyepiece optical system is 3, and the following conditions (1), (2) and (3) are satisfied.

$1.55 < n_{dp}$   (1)

$0.35 < f_e/D_{ip} < 0.60$   (2)

$1.0 < D_3/(D_1+D_2) < 1.8$   (3)

15 Claims, 5 Drawing Sheets

VIEWING OPTICAL SYSTEM, AND IMAGING APPARATUS COMPRISING THE SAME

This application claims benefit of Japanese Patent Application No. 2007-263971 filed in Japan on Oct. 10, 2007, the contents of which are incorporated by this reference.

BACKGROUND OF THE INVENTION

The present invention relates to a viewing optical system for viewing an object image formed on a focusing screen, and an imaging apparatus comprising the same.

So far, a single-lens reflex camera used as an imaging apparatus making use of a film or electronic imaging device has comprised an image erection optical system such as a penta roof prism and an eyepiece lens system adapted to guide a light beam leaving that image erection optical system to the eyeball of a viewer for the purpose of viewing an object image on a focusing screen onto which a subject image is projected via a taking lens.

Such viewing optical systems include those designed to make the refractive index of a prism material so high that an optical path for the image erection function of the prism is easily achievable, as set forth in the following patent publications.

[Patent Publication 1]
JP(A)59-148021
[Patent Publication 2]
JP(A)61-156017
[Patent Publication 3]
JP(A)2005-284039
[Patent Publication 4]
JP(A)2005-55874

However, the eyepiece lens system of the viewing optical system set forth in each patent publication has a longer focal length, and when it is intended to obtain a viewing image having a wide field of view, there is no option but to increase image size on a focusing screen: it is unsuitable for diminishing prism size. On the other hand, digital single-lens reflex cameras are now in wide use as imaging apparatus. However, imaging plane size is smaller than that of a conventional Leica size film: when the aforesaid viewing optical system is used, the viewing angle of field tends to become small.

The present invention has for its object the provision of a viewing optical system that, albeit being of small size, enables subjects to be easily viewed over a wide view of field by some significant tweaks to a lens system while taking advantage of the merit of making sure an optical path length by use of a prism having a high refractive index, and an imaging apparatus comprising the same.

SUMMARY OF THE INVENTION

According to the invention, the aforesaid object is accomplishable as mentioned below.

That is, the invention provides a viewing optical system comprising a screen on which an object image taken via a taking lens is formed, an image erection optical system for erecting the object image formed on said screen, and an eyepiece lens optical system of positive refracting power for guiding a light beam leaving said image erection optical system to the eyeball of a viewer, wherein said image erection optical system comprises a prism having an internal reflective surface, and said eyepiece optical system comprises, in order from a screen side to an exit pupil side, a first lens component of negative refracting power wherein its exit pupil side surface has a paraxial-radius-of-curvature absolute value smaller than a paraxial-radius-of-curvature absolute value of its screen side surface, a second lens component having a double-convex shape, and a third lens component having a meniscus shape concave on its exit pupil side, with satisfaction of the following conditions (1), (2) and (3):

$$1.55 < n_{dp} \quad (1)$$

$$0.35 < f_e/D_{ip} < 0.60 \quad (2)$$

$$1.0 < D3/(D1+D2) < 1.8 \quad (3)$$

where $n_{dp}$ is the d-line refractive index of the prism;

$f_e$ is the focal length of the eyepiece lens system provided that when diopter adjustment is implemented by movement of the lens components, it is going to be the focal length of the eyepiece lens system at −1 diopter;

$D_{ip}$ is an optical path length along an optical axis from an image formation position on the screen to the exit surface of the prism;

D1 is the thickness on the optical axis of the first lens component;

D2 is the thickness on the optical axis of the second lens component;

D3 is the thickness on the optical axis of the third lens component; and the lens components are lenses that are identifiable by an air contact surface, wherein each lens is a single lens or a cemented lens.

As the refractive index of the prism grows high in such a way as to satisfy condition (1), it facilitates making sure an optical path even when the focal length of the eyepiece lens system is curtailed. And to make the prism much smaller while making sure the field of view, it is preferable to curtail the focal length of the eyepiece lens system in such a way as to satisfy condition (2), thereby taking hold of the field of view. To, in that case, make sure the field of view and layout and take hold of optical performance, it is preferable to tweak the arrangement of the eyepiece lens system, thereby facilitating making sure the field of view while placing the principle points closer to the screen.

In the viewing optical system of the invention, the eyepiece lens system is set up and configured as mentioned above.

With such configuration, the positive refracting power of the second lens component on which the main positive refracting power of the eyepiece lens system concentrates is shared by both its surfaces, and aberrations at the second lens component are canceled out by the negative refracting power of the first lens component. Further, the second lens component is configured in such a way as to have a concave surface on the exit pupil side so that off-axis light rays are flipped up while holding back the occurrence of aberrations, working favorably for setting up a wide field-of-view arrangement.

And the third lens component is configured as a meniscus shape concave on the exit pupil side to bring the principal points of the eyepiece lens system nearer to the screen side. This works favorably for making sure the space to receive the prism even when the focal length of the eyepiece lens system is curtailed.

And if the third lens component is configured as a meniscus shape concave on the exit pupil side, it is then possible to diminish the angle of off-axis light beams incident on, and leaving, the third lens component, thereby holding back the occurrence of off-axis aberrations.

Here, if the thickness on the optical axis of the second lens component is ensured in such a way as to satisfy condition (3), then it works more favorably for correction of field curvature, because the principal points of the eyepiece lens system can be located nearer to the screen.

By abiding by at least the lower limit of condition (1), the optical path length of the prism with respect to a length as calculated on an air basis is kept so long that even when the focal length of the eyepiece lens system is cut down, it is easy to make sure the optical path for image erection.

Further to condition (1), there may be the upper limit added, as described below.

$$1.55<ndp<2.5 \quad (1)'$$

Abiding by at least the upper limit of 2.5 to condition (1)' is preferable for reducing material costs.

Abiding by at least the lower limit of condition (2) helps reduce the refracting power of the eyepiece lens system so that the curvature of each lens surface is easily reduced and design with limited aberrations is easily achievable. Further, abiding by at least the upper limit of condition (2) makes sure the refracting power of the eyepiece lens system, working favorably for setting up a wide field-of-view arrangement.

Abiding by at least the lower limit of condition (3) makes sure the thickness of the third lens component, working favorably for adjustment of the principal points and correction of field curvature. It is also preferable to abide by at least the upper limit of condition (3), because it is easy to make sure an eye point (the distance from the eyepiece lens system to the exit pupil).

Further, it is more preferable to satisfy one or more of the following requirements at the same time.

For the eyepiece lens system, it is preferable to satisfy the following condition (4):

$$0.5<f2/fe<1.0 \quad (4)$$

Here f2 is the focal length of the second lens component.

Condition (4) defines the more preferable refracting power of the second lens component. Abiding by at least the lower limit of condition (4) holds back the refracting power of the second lens component and the sharing of positive refracting power on the convex surface of the third lens component on the screen side works favorably for decreases in various aberrations and decreases in aberration fluctuations due to decentration. It is also preferable to abiding by at least the upper limit of condition (4), because the positive refracting power of the second lens component is ensured and it is possible to place the refracting power or principal points of the eyepiece lens system nearer to the screen.

For the eyepiece lens system, it is also preferable to satisfy the following condition (5):

$$-0.4<f2/f1<-0.2 \quad (5)$$

Here f1 is the focal length of the first lens component, and f2 is the focal length of the second lens component.

Condition (5) defines a more preferable refracting power balance between the first lens component and the second lens component. It is preferable to abide by at least the lower limit of condition (5), because the negative refracting power of the first lens component is kept moderate: it works favorably for reducing the size of the eyepiece lens system. It is also preferable to abide by at least the upper limit of condition (5), because the negative refracting power of the first lens component is ensured to make sure an aberration correction function and a function of enlarging the field of view.

The third lens component here is a cemented doublet lens comprising a positive lens and a negative lens in order from the screen side, and for that doublet lens it is preferable to satisfy the following condition (6):

$$10<vd3p-vd3n<60 \quad (6)$$

Here vd3p is the Abbe constant on a d-line basis of the positive lens in the third lens component, and vd3n is the Abbe constant on a d-line basis of the negative lens in the third lens component.

The third lens component has an increased thickness on the optical axis; it is preferable for this lens component to comprise a positive lens and a negative lens, thereby having a chromatic aberration correction function. Condition (6) defines one that is preferable for correction of chromatic aberrations. It is preferable to abide by at least the lower limit of condition (6), because the dispersion of the negative lens is ensured to facilitate correction of chromatic aberrations. It is also preferable to abide by at least the upper limit of condition (6), because the material of the negative lens or positive lens is prevented from having too large anomalous dispersion, thereby holding back the secondary spectra.

For the third lens component it is also preferable to satisfy the following condition (7):

$$-0.55<f3n/f3p<-0.45 \quad (7)$$

Here f3p is the focal length of the positive lens in the third lens component, and f3n is the focal length of the negative lens in the third lens component.

Condition (7) defines a more preferable refracting power balance between the positive lens and the negative lens in the third lens component. It is preferable to abide by at least the lower limit of condition (7), because the refracting power of the negative lens is ensured: it works favorably for adjustment of the principal points and correction of aberrations such as chromatic aberrations. In view of aberration balances, it is also preferable to abide by at least the upper limit of condition (7), because the refracting power of the positive lens is ensured to share the positive refracting power with it and the second lens group while making sure the positive refracting power of the eyepiece lens system.

For the third lens component it is also preferable to satisfy the following conditions (8) and (9):

$$0.30<R3f/fe<0.60 \quad (8)$$

$$0.20<R3r/fe<0.35 \quad (9)$$

Here R3f is the paraxial radius of curvature of the entrance-side surface of the third lens component, and R3r is the paraxial radius of curvature of the exit-side surface of the third lens component.

These conditions define together more preferable relationships for making sure the principal points and aberration correction function of the third lens component.

Condition (8) defines the paraxial radius of curvature of the third lens component at the entrance-side surface. As far as condition (8) is satisfied, it is easy to diminish the angle of incidence of off-axis light beams on the entrance-side surface so that the occurrence of off-axis aberrations is held back, and the positive refracting power is suitably shared with the third lens component: this works favorably for reductions of axial aberrations, etc.

Condition (9) defines the paraxial radius of curvature of the third lens component at the exit-side surface. As far as condition (9) is satisfied, it is easy to diminish the angle of incidence of off-axis light beams leaving the exit-side surface so that the occurrence of off-axis aberrations is held back, and a suitable negative refracting power is ensured to make sure the functions of adjusting the principal points and canceling out various aberrations.

The positive and negative lenses in the third lens component are preferably each a meniscus lens concave on the exit pupil side.

It is then easy to reduce the angle of incidence of off-axis light beams on the cementing surface of the third lens component, thereby reducing the influence on aberrations of the decentration of the third lens component.

For the second lens component it is also preferable to have an aspheric convex surface in which the absolute value of curvature becomes small with a distance from the optical axis.

The second lens component is one that has an increasing positive refracting power, and is located at a position where an axial light beam is suitably spaced away from an off-axis light beam. For this reason, if the second lens component is allowed to have the aforesaid aspheric surface, it is easy to correct both axial aberrations and off-axis aberrations.

The first lens component is also preferably of a meniscus shape convex on the screen side.

That meniscus shape helps reduce the negative refracting power of the first lens component so that the first lens component can have an increased curvature at the exit pupil-side surface while mitigating influences on the principal points, thereby favorably making sure the function of canceling out aberrations at the second lens component, or favorably making sure the space for movement of the second lens component for diopter adjustment.

The first lens component, and the aforesaid second lens component is preferably a single lens.

Such an arrangement works favorably for cost reductions, and size reductions as well.

Further, the second lens component is preferably movable along the optical axis of the viewing optical system.

More preferably, the second lens component is easy to have a suitable refracting power, and movable for diopeter adjustment.

The image erection optical system is preferably a penta room prism having a roof reflective surface.

The use of the penta roof prism makes it possible to bend back the optical path, working favorably for reductions in the size of the image erection optical system.

The present invention also provides an imaging apparatus comprising an imaging device located on a taking optical path and adapted to receive an image formed via a taking lens for conversion into electrical signals, a reflecting mirror for splitting an optical path from the taking lens into a viewing optical path and a taking optical path, and a viewing optical system located on said viewing optical path side.

The imaging device is more likely to be restricted by the angle of incidence of light rays than films. For this reason, the size of the imaging plane of the imaging device is suitably diminished so that the taking lens is of suitable size, too, while allowing light to be almost vertically incident on the light receptor surface of the imaging device.

On the other hand, as the imaging plane is small, it makes it easy to diminish the viewing angle of field; if the inventive viewing optical system is used, it is preferable because there can be an imaging apparatus set up, which, albeit being of small size, can view subjects over a wide field of view.

Two or more of the aforesaid aspects of the invention are preferably satisfied at the same time, because the viewing optical system grows much smaller and performs much better.

Two or more of the aforesaid conditions are preferably satisfied at the same time, too.

More preferably, each condition should be narrowed down as follows.

More preferably, the lower limit of condition (1), (1)' is set at 1.57, especially 1.58. More preferably, the upper limit is set at 2.1, especially 1.9.

More preferably, the lower limit of condition (2) is set at 0.40, especially 0.45. More preferably, the upper limit is set at 0.55, especially 0.51.

More preferably, the lower limit of condition (3) is set at 1.1, especially 1.2. More preferably, the upper limit is set at 1.7, especially 1.6.

More preferably, the lower limit of condition (4) is set at 0.6, especially 0.7. More preferably, the upper limit is set at 0.9, especially 0.83.

More preferably, the lower limit of condition (5) is set at −0.37, especially −0.35. More preferably, the upper limit is set at −0.25, especially −0.30.

More preferably, the lower limit of condition (6) is set at 15, especially 20. More preferably, the upper limit is set at 40, especially 30.

More preferably, the lower limit of condition (7) is set at −0.53, especially −0.51. More preferably, the upper limit is set at −0.47, especially −0.49.

More preferably, the lower limit of condition (8) is set at 0.35, especially 0.40. More preferably, the upper limit is set at 0.55, especially 0.50.

More preferably, the lower limit of condition (9) is set at 0.23, especially 0.25. More preferably, the upper limit is set at 0.32, especially 0.28.

According to the invention, it is possible to obtain a viewing optical system that, albeit being of small size, can view subjects over a wide field of view by tweaking the eyepiece lens system while taking advantage of the merit of making sure the optical path length by use of a prism having a high refractive index.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

Some examples of the invention are now explained with reference to the drawings.

Figure 1:
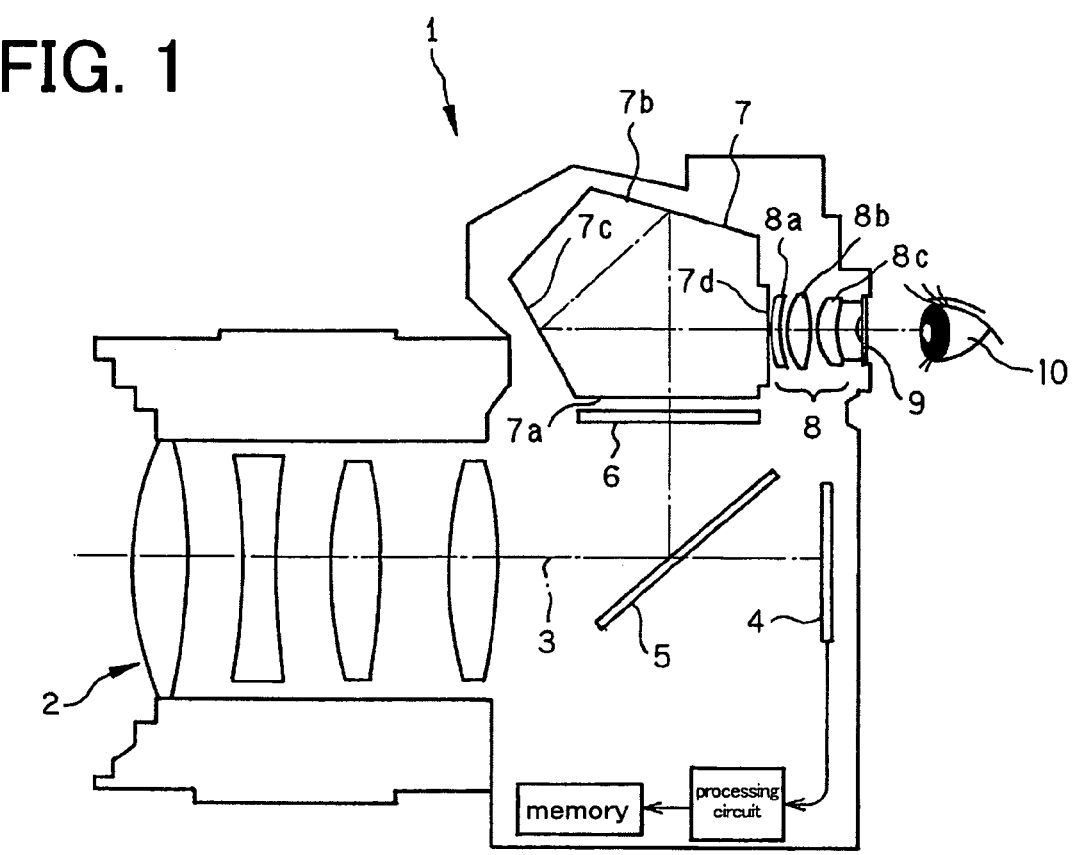
FIG. 1 is illustrative in schematic, common to the respective examples, of the arrangement of one embodiment of a single-lens reflex camera comprising the inventive viewing optical system.

FIG. 1 is illustrative in schematic, common to the respective examples, of the arrangement of one embodiment of a single-lens reflex camera comprising the inventive viewing optical system.

In a single-lens reflex camera 1 of FIG. 1, a taking lens 2 is interchangeably attached to the camera by a mount (not shown). Note here that even an arrangement that does not include a taking lens is herein defined as a single-lens reflex camera (imaging apparatus) provided that the taking lens is attachable to it.

In FIG. 1, reference numeral 4 is a CCD (or CMOS or the like). On the basis of signals from this CCD, image processing is implemented at a processing circuit to store image information in a memory. The stored image may be displayed on a personal computer (not shown) or the like, or it may be recorded and stored in various storage media.

Reference numeral 5 is a quick return mirror located on an optical axis 3 of a taking lens 2 between the taking lens 2 and CCD 4, and 6 a finder screen located on a path of light reflected by the quick return mirror, wherein its entrance surface or exit surface is sand polished. On this surface there is an object image formed. By movement of the quick return mirror 5, a taking optical path is time split from a viewing optical path.

Reference numeral 7 is a penta roof prism acting as an image erection optical system, which prism is made up of, in order from its optical path, a planar entrance surface 7a, a roof reflective surface 7b, a planar reflective surface 7c, and a planar exit surface 7d, and is adapted to erect an object image formed on the screen plane. For the image erection optical system, there may be a mode for reflecting an optical path the way a Porro prism does; however, the penta roof prism is more advantageous over it in terms of size reductions.

The penta roof prism or eyepiece lens system is embodied as shown in the examples given later.

On the exit side of the eyepiece lens system 8, there is a plane-parallel plate 9 provided as a cover glass. This cover glass may be dispensed with, if the lens component of the eyepiece lens system on the exit pupil side is designed as a cover glass.

And an exiting light beam is guided to the pupil 10 of a viewer positioned near the exit pupil so that the image to be taken can be viewed.

It is here noted that the single-lens reflex camera may be designed such that the taking lens 2 is integral with the camera body: it is not interchangeable.

It is also noted that a half-silvered mirror or an optical path splitter prism may be used instead of the quick return mirror 5.

Further, it is noted that the screen surface may be not only sand polished but also constructed of a set of microprisms lining up in a two-dimensional pattern, a hologram plane or the like.

Still further, it is noted that the surface in opposition to the screen surface 6 may be constructed of an optical surface having convergent action such as a Fresnel or convex surface to enhance the collective action at the periphery of the screen.

If optical refractive power is given to the entrance or exit surface of the prism that is the image erection optical system or there is a field lens disposed near the screen surface 6, it is then possible to make correction of aberrations and collective efficiency much better.

Figure 2:
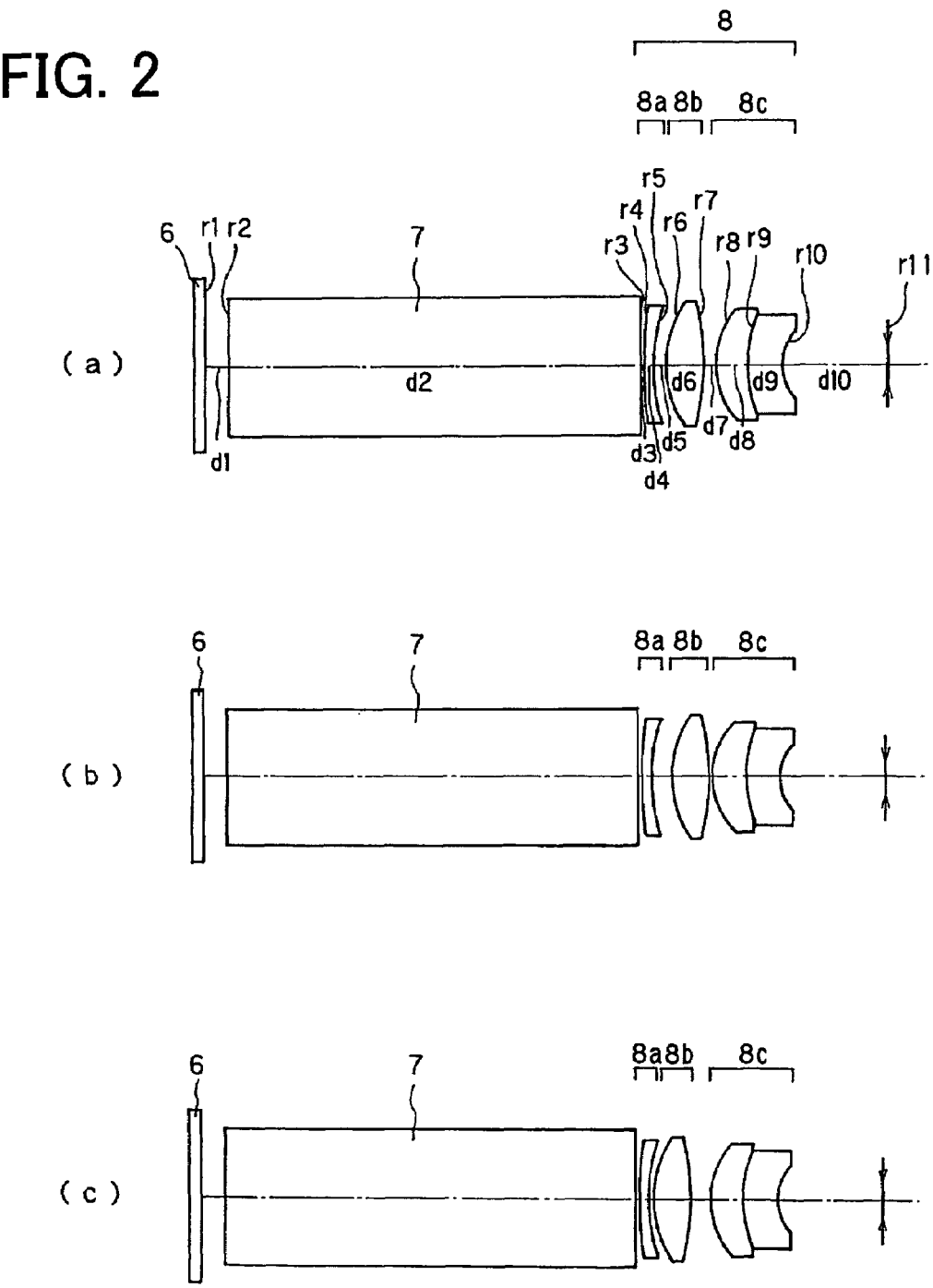
FIG. 2 is illustrative in section along the optical axis of the optical arrangement according to the first example of the viewing optical system, and the imaging apparatus according to the invention.

FIG. 2 is illustrative in section along the optical axis of the optical arrangement according to the first example of the viewing optical system and imaging apparatus of the invention; (a) is illustrative of what goes on at a diopter of −1m−1, (b) what goes on at a diopter of +1m−1, and (c) what goes on at a diopter of −3m−1.

As regards a plane-parallel plate member in FIG. 2, it is noted that for convenience of illustration, the penta roof prism is shown in a taken-apart form. The cover glass is given as calculated on an air basis, and so is not shown.

Figure 3:
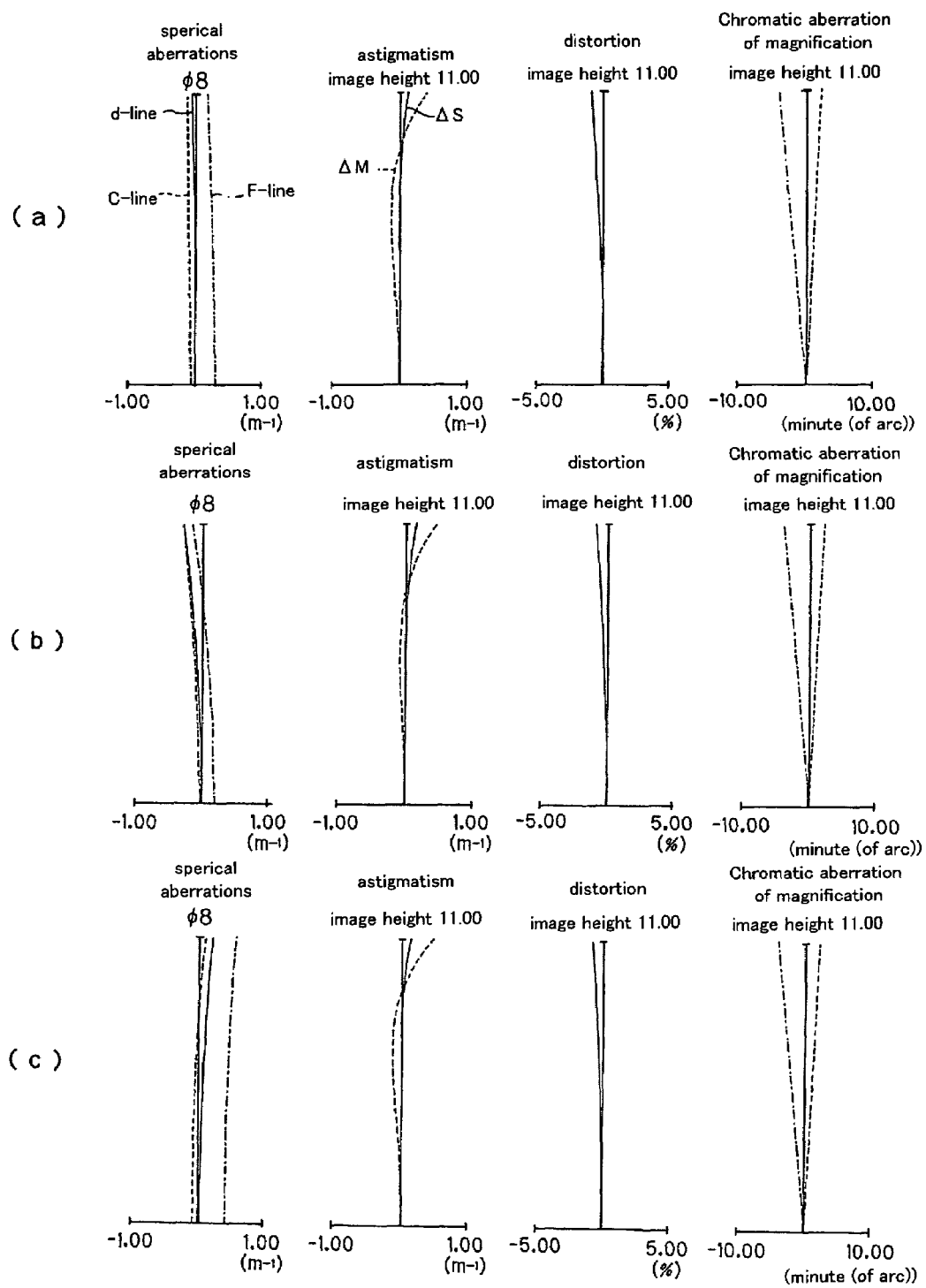
FIG. 3 is an aberration diagram for spherical aberrations, field curvature, distortion and chromatic aberration of magnification in the first example.

FIG. 3 is an aberration diagram for spherical aberrations, field curvature, distortion and chromatic aberration of magnification in the first example; (a) is illustrative of what goes on at a diopter of −1m−1, (b) what goes on at a diopter of +1m−1, and (c) what goes on at a diopter of −3m−1. It is here noted that FIG. 3 is presented with diopter (m−1) as abscissa for spherical aberrations and field curvature and angle (min.) as abscissa for chromatic aberration of magnification. It is also noted that the spherical aberrations and chromatic aberration of magnification are represented by figures at the wavelengths of 587.6 nm (d-line: solid line), 486.1 nm (F-line: one-dot chain line) and 656.3 nm (C-line: dotted line), and as regards astigmatism, a solid line is indicative of a sagittal image surface and a dotted line of a meridional image surface.

The viewing optical system, and the imaging apparatus according to the first example comprises a focusing screen 6 having a sand polished surface, on which an object image is to be formed, a penta roof prism 7 and an eyepiece lens system 8.

The eyepiece lens system 8 is made up of, in order from the screen side, a first lens component 8a consisting of a negative meniscus lens convex on the screen side, a second lens component 8b consisting of a double-convex positive lens, and a third lens component 8c that consists of a cemented lens of a positive meniscus lens convex on the screen side and a negative meniscus lens convex on the screen side and has negative refracting power. Diopter adjustment is implemented by moving the second lens component 8b.

Two aspheric surfaces are used: one at the exit pupil-side surface of the negative meniscus lens that is the first lens component 8a and one the screen side of the double-convex positive lens that is the second lens component 8b.

Enumerated below are the numerical data about the viewing optical system according to the first example.

In the respective examples given below, r is the paraxial radius of curvature of a lens surface, d is a lens thickness and an air separation, nd and vd are a refractive index and an Abbe constant on a d-line ($\lambda$=587.6 nm) basis. K is a conical coefficient, A4, A6, A8 and A10 are aspheric coefficients, and E±n is indicative of ×10±n.

Using each aspheric coefficient in each example, each aspheric shape is represented by the following formula:

$$Z=(Y^2/r)/[1+\{1-(1+K)\cdot(Y/r)^2\}^{1/2}]+A4\times Y4+A6\times Y6+A8\times Y8+A10\times Y10$$

where Z is acoordinates in the optical axis direction, and Y is coordinates in the direction vertical to the optical axis direction.

Numerical Example 1
Unit: mm

Surface data

| Surface No. | r | d | nd | vd |
|---|---|---|---|---|
| Object image (sand polished surface) | ∞ | 4.9 | | |
| 1 | ∞ | 85 | 1.58313 | 59.38 |
| 2 | ∞ | 0.8 | | |
| 3 | 125.21 | 1.8 | 1.58423 | 30.49 |
| 4 (aspheric) | 42.6776 | variable | | |
| 5 (aspheric) | 24.8349 | 7.3 | 1.52542 | 55.78 |
| 6 | −65.978 | variable | | |
| 7 | 19.65 | 6.7 | 1.7725 | 49.6 |
| 8 | 34.06 | 6.8 | 1.78472 | 25.68 |
| 9 | 11.423 | 19 | | |
| Exit pupil | ∞ | | | |

Aspheric data

Fifth surface

K = 1.98, A4 = −4.9135E−06, A6 = −5.9000E−09

Sixth surface

K = −0.147, A4 = −1.1114E−05, A6 = −8.3900E−09

Various data

| Diopter (m−1) | +1 | −1 | −3 |
|---|---|---|---|
| Focal length | 42.9868 | 43.4294 | 43.9064 |
| Angle of field | 28.5553° | 28.9875° | 28.0010° |

Pupil diameter (diameter) φ = 8 mm
Object image diagonal length 22 mm

| | | | |
|---|---|---|---|
| d5 | 4.22823 | 2.61562 | 0.991 |
| d7 | 0.97177 | 2.58438 | 4.209 |

Focal length of each lens

| | |
|---|---|
| First lens component | −111.7218 |
| Second lens component | 35.3185 |
| Third lens component | −117.6477 |
| Positive lens in the third lens component | 49.993 |
| Negative lens in the third lens component | −25.235 |

Figure 4:
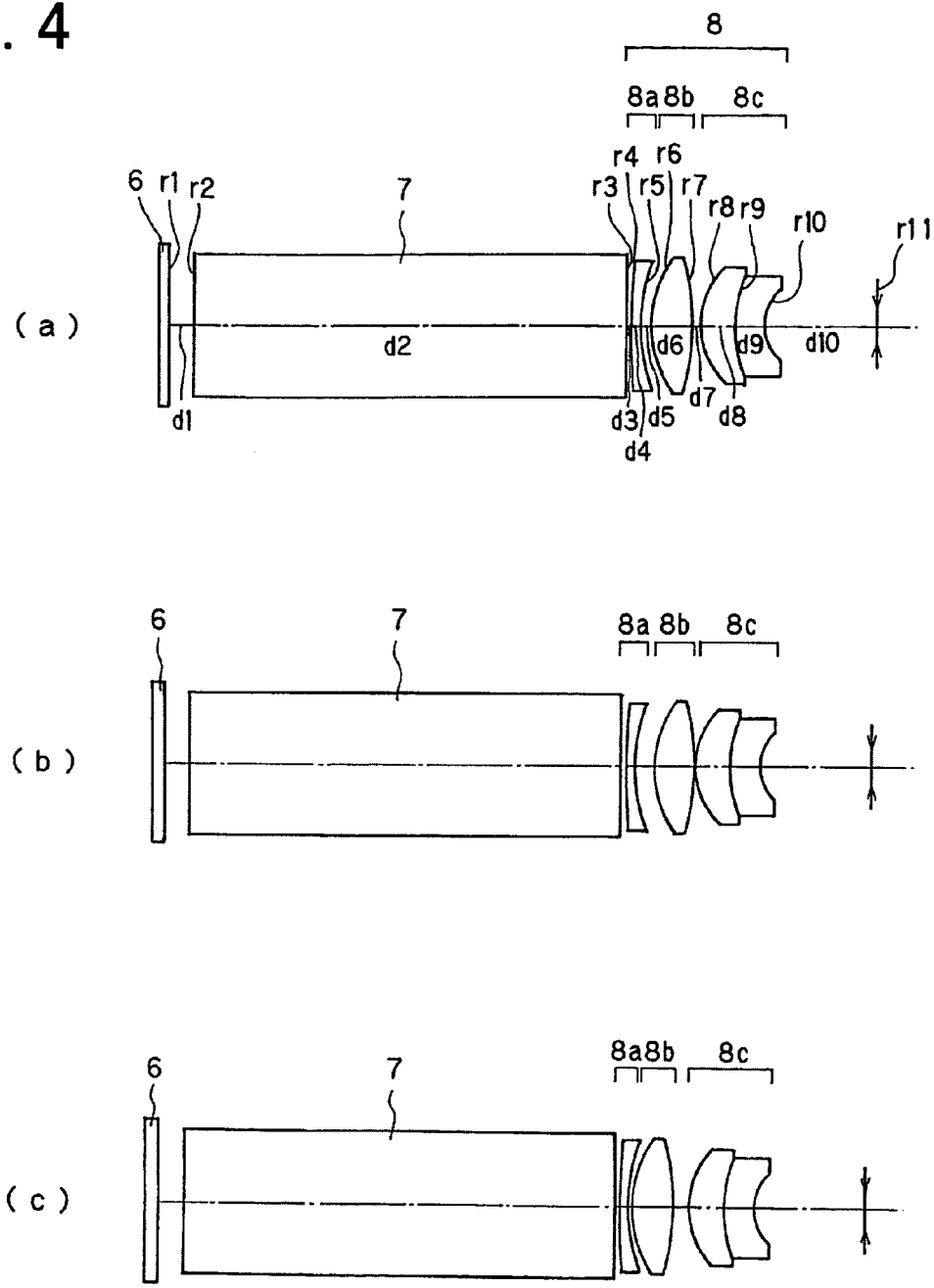
FIG. 4 is illustrative in section along the optical axis of the optical arrangement according to the second example of the viewing optical system, and the imaging apparatus according to the invention.

FIG. 4 is illustrative in section along an optical axis of the optical arrangement according to the second example of the viewing optical system and imaging apparatus of the invention; (a) is illustrative of what goes on at a diopter of −1m−1, (b) what goes on at a diopter of +1m−1, and (c) what goes on at a diopter of −3m−1.

As regards a plane-parallel plate member in FIG. 4, it is noted that for convenience of illustration, the penta roof prism is shown in a taken-apart form. The cover glass is given as calculated on an air basis, and so is not shown.

Figure 5:
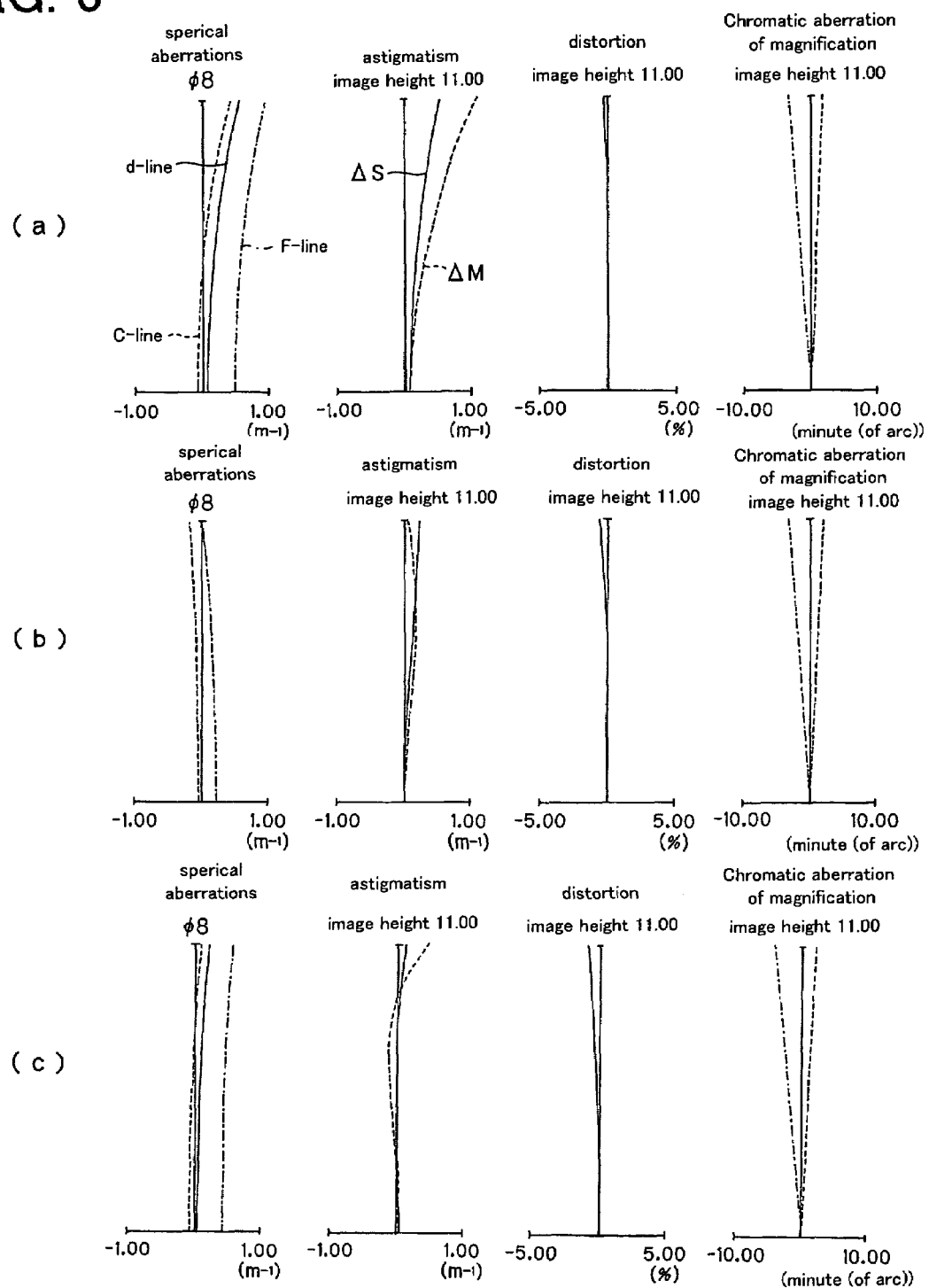
FIG. 5 is an aberration diagram for spherical aberrations, field curvature, distortion and chromatic aberration of magnification in the second example.

FIG. 5 is an aberration diagram for spherical aberrations, field curvature, distortion and chromatic aberration of magnification in the first example; (a) is illustrative of what goes on at a diopter of −1m−1, (b) what goes on at a diopter of +1m−1, and (c) what goes on at a diopter of −3m−1. It is here noted that FIG. 5 is presented with diopter (m−1) as abscissa for spherical aberrations and field curvature, and angle (min.) as abscissa for chromatic aberration of magnification. It is also noted that the spherical aberrations and chromatic aberration of magnification are represented by figures at the wavelengths of 587.6 nm (d-line: solid line), 486.1 nm (F-line: one-dot chain line) and 656.3 nm (C-line: dotted line), and as regards astigmatism, a solid line is indicative of a sagittal image surface and a dotted line of a meridional image surface.

The viewing optical system, and the imaging apparatus according to the second example comprises a focusing screen 6 having a sand polished surface, on which an object image is to be formed, a penta roof prism 7 and an eyepiece lens system 8.

The eyepiece lens system 8 is made up of, in order from the screen side, a first lens component 8a consisting of a negative meniscus lens convex on the screen side, a second lens component 8b consisting of a double-convex positive lens, and a third lens component 8c that consists of a cemented lens of a positive meniscus lens convex on the screen side and a negative meniscus lens convex on the screen side and has negative refracting power. Diopter adjustment is implemented by the movement of the second lens component 8b.

One aspheric surface is used on the screen side of the double-convex positive lens that is the second lens component 8b.

Enumerated below are the numerical data about the viewing optical system according to the second example.

Numerical Example 2
Unit: mm

Surface data

| Surface No. | r | d | nd | vd |
|---|---|---|---|---|
| Object image (sand polished surface) | ∞ | 4.9 | | |
| 1 | ∞ | 85 | 1.58313 | 59.38 |
| 2 | ∞ | 0.8 | | |
| 3 | 157.5957 | 1.8 | 1.58423 | 30.49 |
| 4 | 41.8732 | variable | | |
| 5 (aspheric) | 23.528 | 8 | 1.52542 | 55.78 |
| 6 | −61.2841 | variable | | |
| 7 | 19.05334 | 6.5 | 1.7725 | 49.6 |
| 8 | 30.049 | 6 | 1.78472 | 25.68 |
| 9 | 11.2086 | 19 | | |
| Exit pupil | ∞ | | | |

Aspheric data

Fifth surface

K = 1.98, A4 = −4.9135E−06, A6 = −5.9000E−09

Sixth surface

K = −0.2918, A4 = −1.0541E−05, A6 = −2.8530E−09, A8 = −1.0497E−11

Various data

| Diopter (m−1) | +1 | −1 | −3 |
|---|---|---|---|
| Focal length | 43.7688 | 44.3413 | 44.9344 |
| Angle of field | 28.0996° | 28.2719° | 27.7910° |

Pupil diameter (diameter) φ = 8 mm
Object image diagonal length 22 mm

| | | | |
|---|---|---|---|
| d5 | 4.22823 | 2.61562 | 0.991 |
| d7 | 0.97177 | 2.58438 | 4.209 |

Focal length of each lens

| | |
|---|---|
| First lens component | −98.1697 |
| Second lens component | 33.4436 |
| Third lens component | −110.0467 |
| Positive lens in the third lens component | 53.5955 |
| Negative lens in the third lens component | −26.4904 |

-continued

Numerical Example 2
Unit: mm

Enumerated below are the values of conditions (1) to
(9) in the respective examples.

| Condition | Example 1 | Example 2 |
|---|---|---|
| (1) | 1.58313 | 1.58313 |
| (2) | 0.483086 | 0.493229 |
| (3) | 1.483516 | 1.27551 |
| (4) | 0.813239 | 0.754231 |
| (5) | −0.31613 | −0.34067 |
| (6) | 23.92 | 23.92 |
| (7) | −0.50477 | −0.49427 |
| (8) | 0.452458 | 0.429699 |
| (9) | 0.263025 | 0.25278 |

Enumerated below are the parameter values in the respective examples.

| Parameter | Example 1 | Example 2 |
|---|---|---|
| ndp | 1.58313 | 1.58313 |
| Fe | 43.4294 | 44.3413 |
| dip | 89.9 | 89.9 |
| d1 | 1.8 | 1.8 |
| d2 | 7.3 | 8 |
| d3 | 13.5 | 12.5 |
| f1 | −111.722 | −98.1697 |
| f2 | 35.3185 | 33.4436 |
| f3p | 49.993 | 53.5955 |
| f3n | −25.235 | −26.4904 |
| vd3p | 49.6 | 49.6 |
| vd3n | 25.68 | 25.68 |
| R3f | 19.65 | 19.0534 |
| R3r | 11.423 | 11.2086 |

In addition to the features recited in the claims, the viewing optical system of the invention, and the imaging apparatus comprising it has such features as mentioned below.

A. A viewing optical system, comprising:
a screen on which an object image taken via a taking lens is formed,
an image erection optical system for erecting an object image formed on said screen, and
an eyepiece lens system having positive refracting power for guiding a light beam leaving said image erection optical system to the eyeball of a viewer, wherein:
said image erection optical system comprises a prism having an internal reflective surface,
said eyepiece comprises, in order from the screen side to an exit pupil side,
a first lens component having negative refracting power,
a second lens component having positive refracting power, and
a third lens component configured in a meniscus shape concave on the exit pupil side, with the satisfaction of the following conditions (1) and (2):

$$1.55 < ndp \quad (1)$$

$$0.35 < re/Dip < 0.60 \quad (2)$$

where ndp is the d-line refractive index of the prism;
fe is the focal length of the eyepiece lens system provided that when diopter adjustment is implemented, it is going to be the focal length of the eyepiece lens system at −1 diopter;
Dip is an optical path length along an optical axis from an image formation position on the screen to the exit surface of the prism; and
the lens components are lenses that are identifiable by an air contact surface, wherein each lens is a single lens or a cemented lens.

B. An imaging apparatus, comprising:
an imaging device located on a taking optical path and adapted to receive an image formed via a taking lens for conversion into electrical signals,
a reflecting mirror for splitting an optical path from the taking lens into a viewing optical path and a taking optical path, and
a viewing optical system as recited in the aforesaid A and located on said viewing optical path side.

What is claimed is:

1. A viewing optical system, comprising:
a screen on which an object image taken via a taking lens is formed,
an image erection optical system for erecting the object image formed on said screen, and
an eyepiece lens optical system of positive refracting power for guiding a light beam leaving said image erection optical system to a viewer's eyeball, wherein:
said image erection optical system comprises a prism having an internal reflective surface, and
said eyepiece optical system comprises, in order from a screen side to an exit pupil side,
a first lens component of negative refracting power wherein an exit pupil side surface has a paraxial-radius-of-curvature absolute value smaller than a paraxial-radius-of-curvature absolute value of a screen side surface,
a second lens component having a double-convex shape, and
a third lens component having a meniscus shape concave on an exit pupil side, with satisfaction of the following conditions (1), (2) and (3):

$$1.55 < ndp \quad (1)$$

$$0.35 < fe/Dip < 0.60 \quad (2)$$

$$1.0 < D3/(D1+D2) < 1.8 \quad (3)$$

where ndp is a d-line refractive index of the prism;
fe is a focal length of the eyepiece lens system provided that when diopter adjustment is implemented by movement of the lens components, it is going to be the focal length of the eyepiece lens system at −1 diopter;
Dip is an optical path length along an optical axis from an image formation position on the screen to an exit surface of the prism;
D1 is a thickness on the optical axis of the first lens component;
D2 is a thickness on the optical axis of the second lens component;
D3 is a thickness on the optical axis of the third lens component; and
the lens components are lenses that are identifiable by an air contact surface, wherein each lens is a single lens or a cemented lens.

2. The viewing optical system according to claim 1, wherein said eyepiece lens system satisfies the following condition (4):

$$0.5 < f2/fe < 1.0 \quad (4)$$

where f2 is a focal length of the second lens component.

3. The viewing optical system according to claim 1, wherein said eyepiece lens system satisfies the following condition (5):

$$-0.4 < f2/f1 < -0.2 \quad (5)$$

where f1 is a focal length of the first lens component, and f2 is a focal length of the second lens component.

4. The viewing optical system according to claim 1, wherein said third lens component is a cemented doublet lens component comprising, in order from a screen side, a positive lens element and a negative lens element, with satisfaction of the following condition (6):

$$10 < vd3p - vd3n < 60 \quad (6)$$

where vd3p is an Abbe constant on a d-line basis of the positive lens element in the third lens component, and vd3n is an Abbe constant on a d-line basis of the negative lens element in the third lens component.

5. The viewing optical system according to claim 4, wherein said third lens component satisfies the following condition (7):

$$-0.55 < f3n/f3p < -0.45 \quad (7)$$

where f3p is a focal length of the positive lens element in the third lens component, and f3n is a focal length of the negative lens element in the third lens component.

6. The viewing optical system according to claim 4, wherein said positive lens element and said negative lens element in said third lens component are each a meniscus lens element concave on an exit pupil side.

7. The viewing optical system according to claim 1, wherein said third lens component satisfies the following conditions (8) and (9):

$$0.30 < R3f/fe < 0.60 \quad (8)$$

$$0.20 R3r/fe < 0.35 \quad (9)$$

where R3f is a paraxial radius of curvature of an entrance-side surface of the third lens component, and R3r is a paraxial radius of curvature of an exit-side surface of the third lens component.

8. The viewing optical system according to claim 1, wherein said second lens component has an aspheric convex surface wherein a curvature absolute value becomes smaller with a distance from the optical axis.

9. The viewing optical system according to claim 1, wherein said first lens component has a meniscus shape convex on a screen side.

10. The viewing optical system according to claim 1, wherein said first lens component, and said second lens component is a single lens.

11. The viewing optical system according to claim 1, wherein said second lens component moves along an optical axis of the viewing optical system.

12. The viewing optical system according to claim 1, wherein said image erection optical system is a penta roof prism having a roof reflective surface.

13. An imaging apparatus, comprising:
an imaging device located on a taking optical path and adapted to receive an image taken via a taking lens for conversion into electrical signals,
a reflecting mirror for splitting an optical path from said taking lens into a viewing optical path and a said taking optical path, and
a viewing optical system located on said viewing optical path side, wherein:
said viewing optical system is a viewing optical system as recited in claim 1.

14. A viewing optical system, comprising:
a screen on which an object image taken via a taking lens is formed,
an image erection optical system for erecting an object image formed on said screen, and
an eyepiece lens system having positive refracting power for guiding a light beam leaving said image erection optical system to a viewer's eyeball, wherein:
said image erection optical system comprises a prism having an internal reflective surface,
said eyepiece optical system comprises, in order from a screen side to an exit pupil side,
a first lens component having negative refracting power,
a second lens component having positive refracting power,
a third lens component configured in a meniscus shape concave on the exit pupil side,
a total number of lens components included in said eyepiece optical system is 3, with the satisfaction of the following conditions (1) and (2):

$$1.55 < ndp \quad (1)$$

$$0.35 < fe/Dip < 0.60 \quad (2)$$

where ndp is a d-line refractive index of the prism;
fe is a focal length of the eyepiece lens system provided that when diopter adjustment is implemented, it is going to be the focal length of the eyepiece lens system at −1 diopter;
Dip is an optical path length, along an optical axis from an image formation position on the screen to an exit surface of the prism; and
the lens components are lenses that are identifiable by an air contact surface, wherein each lens is a single lens or a cemented lens.

15. An imaging apparatus, comprising:
an imaging device located on a taking optical path and adapted to receive an image taken via a taking lens for conversion into electrical signals,
a reflecting mirror for splitting an optical path from said taking lens into a viewing optical path and said taking optical path, and
a viewing optical system located on said viewing optical path side, wherein:
said viewing optical system is a viewing optical system as recited in claim 14.

* * * * *